United States Patent [19]

Tieszen

[11] 3,853,824
[45] Dec. 10, 1974

[54] POLY(ARYLENE SULFIDE) POLYMERS
[75] Inventor: Dale O. Tieszen, Bartlesville, Okla.
[73] Assignee: Phillips Petroleum Company, Bartlesville, Okla.
[22] Filed: Sept. 19, 1973
[21] Appl. No.: 398,573

[52] U.S. Cl. ............ 260/79, 117/124 R, 117/132 R, 117/161 R, 260/33.4 R, 260/37 R, 260/79.1, 260/900
[51] Int. Cl. ............................................ C08g 25/00
[58] Field of Search .......... 260/79, 79.1; 117/161 R, 117/132 R, 124 R

[56] References Cited
UNITED STATES PATENTS
3,386,950  6/1968  Horvath et al. ................. 260/45.7 S Primary Examiner—Melvyn I. Marquis
Attorney, Agent, or Firm—Neuman, Williams, Anderson & Olson

[57] ABSTRACT

Improvement in processing and coating quality of poly(arylene sulfide) is achieved by incorporating therewith a sulfur-containing compound of the formula

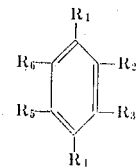

in which not more than four of the positions occupied by $R_1$–$R_6$ contain hydrogen, from 1 to 3 of the positions occupied by $R_1$–$R_6$ have a substituent $R'SH$ group in which $R'$ is an alkylene radical of 1 to 3 carbon atoms and from 0 to 5 of the positions occupied by $R_1$–$R_6$ are filled by alkyl groups having 1 to 12 carbon atoms.

9 Claims, No Drawings

POLY(ARYLENE SULFIDE) POLYMERS

This invention relates to improved coating compositions containing poly(arylene sulfide) polymers.

It is known that poly(arylene sulfide) polymers are useful as coating materials, since coatings formed thereof are strong, heat stable and resistant to most industrial chemicals and fumes. Thus, for example, poly(arylene sulfide) polymers can be advantageously employed as coatings for metals such as steel, aluminum, nickel, brass, copper, as well as ceramics, glass and other substrates stable at the curing temperature required for the coating, i.e., 600°–750° F.

It is an object of this invention to provide coating compositions comprising poly(arylene sulfide) polymers having enhanced properties as to processability, adherency and coating flexibility.

It is a further object of this invention to provide poly(arylene sulfide) coating compositions which can be cured at a relatively fast rate to form good, adherent, flexible coatings for metals and other materials.

The above and other objects of this invention are achieved by incorporating with poly(arylene sulfide) polymers a minor amount of certain relatively high molecular weight thiol compounds. The use of thiols or polythiols with poly(arylene sulfide) resins is disclosed in U.S. Pat. No. 3,386,950. That patent discloses that thiols and polythiols broadly can be employed to reduce or prevent discoloration of poly(arylene sulfide) resins. In accordance with this invention, it has been found that certain thiol compounds can be effectively incorporated in poly(arylene sulfide) resins to speed up the cure rate thereof and improve the quality of the coatings formed by the polymers.

The thiol compounds which have been found useful in accordance with this invention can be represented by the formula:

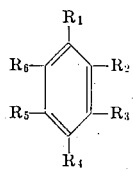

in which not more than four of the R positions contain hydrogen, from 1 to 3 of the R positions have a substituent R'SH group in which R' is an alkylene radical of 1 to 3 carbon atoms and from 0 to 5 of the R positions are filled by alkyl groups having 1 to 12 carbon atoms.

Representative thiol compounds are dodecylbenzyl mercaptan; 1,2-di-mercaptomethyl benzene; 1,3-dimercaptomethyl benzene; (1-mercapto)propyl-2-methylbenzene; 1,3-di-mercaptomethyl-4-ethyl benzene; 1-(2 mercapto)ethyl-3,4-dimethylbenzene; 1-mercaptomethyl-4-octyl benzene; $\alpha,\alpha'$-xylene dithiol; 1-(2-mercapto-ethyl)-4-i-propyl benzene; 1,3,5-tri-mercaptomethyl benzene and mixtures thereof.

The sulfur-containing compounds are incorporated in poly(arylene sulfide) resins prior to curing in amounts ranging from about 3 to 10 parts or more by weight of the polymer.

The above compounds are used in accordance with this invention with normally solid poly(arylene sulfides) generally, regardless of the method of their preparation. Thus, they may be used, for example, with poly(arylene sulfide) resins prepared as described in U.S. Pat. No. 2,513,188, wherein polyhalo aromatic compounds are reacted with sulfur and a metal sulfide at fusion temperatures. They can also be used with resins manufactured by the method described in British Pat. No. 962,941, wherein metal salts of halothiolphenols are heated at a polymerizing temperature. Likewise, the specified thiol additives are useful to improve the coating properties of normally solid poly(arylene sulfide) polymers as described in U.S. Pat. No. 3,354,129 which issued Nov. 21, 1967 to Edmonds and Hill. As disclosed in that patent, these polymers can be prepared by reacting a polyhalo-substituted aromatic compound containing unsaturation between adjacent ring atoms and a mixture made by contacting an alkali metal sulfide with a polar organic compound. The resulting polymer contains the cyclic structure of the polyhalo-substituted compound coupled in repeating units through a sulfur atom. Because of their high thermal stability and availability of the materials from which they are prepared, preferred polymers are those having the repeating unit —R—S where R is phenylene, biphenylene, naphthylene, biphenylene ether or a lower alkyl-substituted derivative thereof. By "lower alkyl" is meant alkyl groups having 1 to 6 carbon atoms such as methyl, propyl, isopropyl, n-hexyl and the like.

The solid poly(arylene sulfide) polymers can have varying melting temperatures, such as in the range from 400° to 900° F. Polymers of phenylene sulfide normally have melting temperatures in the range of about 550° to 900° F. The preferred polymers have an inherent viscosity in chloronaphthalene at 206° C. of at least 0.1, preferably between 0.1 and 0.3, more preferably between 0.13 and 0.23. A particularly preferred polymer is poly(phenylene sulfide) (PPS), having a melt flow of 50 to above 2,500 (limit of instrument measurement by ASTM D-1238-70 modified to operate at a temperature of 343° C under a 5 kg. total load with melt flow rate reported in grams/10 minutes. The virgin PPS which has a melt flow of above 2,500 can be precured by heating in air at 500°–520° F. for 1–6 hours to lower the original melt flow.

The thiol additives of this invention can be incorporated in the polymer prior to curing in any convenient manner. Thus, for example, the additives can be added as such to the polymer and the resulting mixture can be agitated in any convenient manner to achieve good mixing. A particularly convenient manner of introducing the additives into the polymer is the addition of the thiol dissolved in a volatile solvent such as hexane, benzene, acetone and the like with subsequent volatilization of the solvent.

The term "curing" as used herein means a heat treatment of the polymers wherein the melt flow of the polymer is decreased from a value above 2,500 to essentially a value below about 100 or even to 0. The curing times and temperatures for a particular poly(arylene sulfide) polymer will vary widely, but can be readily determined by subjecting the polymer to a heat treatment in air at 510° F. for periods varying from ½ to 6 hours and measuring, at intervals, the melt flow of the polymer using ASTM D-1238-70 modified to operate at a temperature of 343° C. under a 5 kg. total load with melt flow rate reported in grams/10 minutes.

The use of the said thiol additives of this invention speeds up the cure rate of either slow curing or fast curing resins with the improvement in cure rates being evidenced by increased flexibility of the coating. For example, a slow curing poly(phenylene sulfide) resin will ordinarily require 6 hours at 510° F. in air curing time to have a melt flow of less than about 400 without accelerators (see Table II). A fast curing poly(phenylene sulfide) resin will cure to a melt flow of less than about 400 in 2–4 hours at 510° F. Very fast curing resins will cure to a melt flow of less than 100 in 1–2 hours at 510° F. in air without additives. Thus, a polymer with a slow cure rate, which would be reflected in a poorer coating test rating, can be made more suitable for coating with the use of these additives. Also, a polymer having a very good coating test rating can be cured in less time with the use of the described additives than would be required without these additives. It is desirable to accelerate the cure rate of a poly(phenylene sulfide) coating on a substrate, especially certain metals, such as carbon steel, in order to shorten the time such metals have to be exposed to the high curing temperature of say 700° F. In fabricating pipe, for example, the exposure of these to long periods of high temperatures is undesirable because they have a tendency to embrittlement, yet a polymer coating may be required to protect such metal surfaces from corrosion. These mercaptan additives materially shorten the required exposure time of the substrates to these high temperatures as shown below.

In addition to the mercaptan additives, the compositions of this invention can contain other ingredients conventionally employed in poly(arylene sulfide) coating compositions such as, for example, fillers such as titanium dioxide, calcium carbonate, aluminum oxide, aluminum silicate, pigments, resins and/or plasticizers, ferric oxide, silicon dioxide, asbestos fibers, glass fibers, poly(tetrafluoroethylene) and the like.

The advantages of the invention will be further illustrated by the following specific examples.

EXAMPLE I

A coating composition was prepared by mixing in a blender 3 parts by weight of poly(phenylene sulfide) polymer, 1 part of titanium dioxide as a filler and 6 parts of propylene glycol as a vehicle. The poly(phenylene sulfide) polymer employed was made according to Example 1 of U.S. Pat. No. 3,354,129 referred to above and is characterized by a melt flow above 2,500, density 1.34 and intrinsic viscosity 0.15; a slow curing resin, i.e., a curing time of about 6 hours in air at 510° F. to reduce the melt flow to below about 400 without accelerators.

To the above mix were added various amounts of various sulfur compounds dissolved in isopropanol. The formulations were subjected to a coating test which involved the following:

COATING TEST PROCEDURE

1. Cold rolled steel panels, 3 inches × 6 inches × 0.035 inches, were degreased and heated in a gas-$O_2$ flame to a blue-gray color.
2. After cooling to room temperature, three coats of the formulation were applied successively with a No. 60 coating rod, and each coat was baked at 700° F. for 30 minutes (or less as noted in Tables II and III).
3. After the third coat bake, the coated panel was annealed for 2 hours at 450° F. and then allowed to stand overnight at room temperature.
4. The coated panels were bent over a 3/16 inch D mandrel, and the elongated portion was examined with the aid of a microscope at 20X magnification. The ratings of 1 to 5 correspond to the following observations:

| Rating | Observations |
|---|---|
| 1 | No cracking on elongated portion of the annealed coating. |
| 2 | Occasional microcracks along elongated coating. |
| 3 | Numerous microcracks and some cracking which may be barely visible to the unaided eye. |
| 4 | Cracks are continuous and easily visible. |
| 5 | Complete rupture of the coating. |

The results of the coating test were as follows:

TABLE I

EFFECT OF SULFUR COMPOUNDS AND SODIUM HYDROXIDE ON COATING TEST

| Compound | % Wt. of PPS | Coating Test Rating |
|---|---|---|
| Dodecylbenzyl mercaptan | 10 | 1 |
| do. | 5 | 1 |
| do. | 3 | 2 |
| do. | 2 | 3 |
| do. | 1 | 4 |
| $\alpha,\alpha'$-p-xylene dithiol | 10 | 1 |
| do. | 5 | 1 |
| do. | 3 | 1 |
| Sulfur | 5 | Visible Cracking |
| do. | 3 | do. |
| Phenyl disulfide | 5 | do. |
| do. | 3 | do. |
| Octadecyl mercaptan | 3 | 5 |
| Mercaptopropionic Ester | 5 | Moderate Cracking |
| do. | 2 | do. |
| $\beta$-thionaphthol in paraffin | 3 | 4 |
| Sodium hydroxide | 3 | Severe Cracking |
| do. | 2 | do. |
| do. | 1 | do. |

EXAMPLE II

This example illustrates the effect of the additives of the invention on melt flow numbers of a poly(phenylene sulfide) polymer (PPS) which is a slow curing resin which was cured for 6 hours at a temperature of 510° F. Titanium dioxide as a filler and propylene glycol as a vehicle were used as in Example I. Table II gives the results. The precure melt flow of the resin was above 2,500.

TABLE II

EFFECT OF ADDITIVES ON 510° F. CURE OF SLOW CURE PPS ON MELT FLOW NUMBERS

| Compound | % Wt. of PPS | MFN[1] | Method of Mixing Additive |
|---|---|---|---|
| None | — | 373 | Manual |
| Dodecylbenzyl mercaptan | 5 | 0 | do. |
| $\alpha,\alpha'$-p-xylene dithiol | 5 | 29.1 | do. |
| Sulfur | 5 | 114 | do. |

[1] The MFN is a g/10 min. at 650° F. with a 5 Kg weight after the material was cured at 510° F./6 hours. (ASTM D-1238-70 modified to operate at a temperature of 343° C. under a 5 kg. total load with melt flow rate reported in grams/10 minutes.)

The data illustrate the accelerating effect of the additives in modifying the melt flow of the virgin resin.

EXAMPLE III

This example illustrates the effect of the additives of the invention on improvement of coating quality for two lots of poly(phenylene sulfide) polymers (PPS). PPS Lot 1 is a slow curing polymer which, when cured for 30 minutes at 700° F., has a coating rating of 1 or 2. PPS Lot 2 is a faster curing resin which, when cured for 30 minutes at 700° F., has a coating rating of 1. The coating compositions contained titanium dioxide as a filler and propylene glycol as a vehicle as in Example I. The results are shown in Table III.

TABLE III

EFFECT OF ADDITIVES ON COATING TESTS WITH SHORTER CURE TIMES AT 700° F.

| Additive | % Wt of PPS | PPS Lot No | Coating Test Rating | | |
|---|---|---|---|---|---|
| | | | 20 min. | 15 min. | 10 min. |
| None | — | 1 | 3 | 5 | — |
| Dodecylbenzyl mercaptan | 3 | 1 | 1 | 2 | — |
| None | — | 2 | — | 4 | 5 |
| Dodecylbenzyl mercaptan | 3 | 2 | — | 1 | 2 |

The data demonstrate that, with the additive, excellent coatings can be obtained with considerably shortened cure periods.

Those modifications and equivalents which fall within the spirit of the invention are to be considered a part thereof

What is claimed is:

1. A method of coating which comprises applying to an article to be coated a composition comprising a poly(arylene sulfide) polymer and from about 3 to 10 percent by weight of said polymer, a sulfur-containing compound of the formula

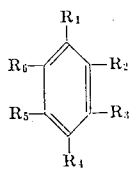

in which not more than four of the positions occupied by $R_1$–$R_6$ contain hydrogen, from 1 to 3 of the positions occupied by $R_1$–$R_6$ have a substituent R′SH group in which R′ is an alkylene radical of 1 to 3 carbon atoms and from 0 to 5 of the positions occupied by $R_1$–$R_6$ are filled by alkyl groups having 1 to 12 carbon atoms.

2. A method in accordance with claim 1 wherein the sulfur-containing compound is dodecylbenzyl mercaptan.

3. A method in accordance with claim 1 wherein the sulfur-containing compound is α,α′-xylene dithiol.

4. A method of coating which comprises applying to an article to be coated a composition comprising poly(phenylene sulfide) and from about 3 to 10 percent by weight of said sulfide a sulfur-containing compound of the formula

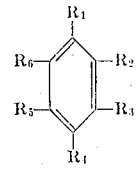

in which not more than four of the positions occupied by $R_1$–$R_6$ contain hydrogen, from 1 to 3 of the positions occupied by $R_1$–$R_6$ have a substituent R′SH group in which R′ is an alkylene radical of 1 to 3 carbon atoms and from 0 to 5 of the positions occupied by $R_1$–$R_6$ are filled by alkyl groups having 1 to 12 carbon atoms.

5. A method in accordance with claim 4 wherein the sulfur-containing compound is dodecylbenzyl mercaptan.

6. A method in accordance with claim 4 wherein the compound is α,α′-xylene dithiol.

7. A method of reducing the melt flow of a poly(arylene sulfide) resin which comprises incorporating therewith in an amount from about 3 to 10 percent by weight of said resin, a sulfur-containing compound of the formula in which not more than four of the positions occupied by $R_1$–$R_6$ contain hydrogen, from 1 to 3 of the positions occupied by $R_1$–$R_6$ have a substituent R′SH group in which R′ is an alkylene radical of 1 to 3 carbon atoms and from 0 to 5 of the positions occupied by $R_1$–$R_6$ are filled by alkyl groups having 1 to 12 carbon atoms.

8. A method in accordance with claim 7 wherein the sulfur-containing compound is dodecylbenzyl mercaptan.

9. A method in accordance with claim 7 wherein the sulfur-containing compound is α,α′-xylene dithiol.

* * * * *